UNITED STATES PATENT OFFICE.

HAYDN M. BAKER, OF WASHINGTON, DISTRICT OF COLUMBIA.

IMPROVED PROCESS OF CLEANING COTTON-WASTE AND OTHER FIBERS FROM OIL, &c.

Specification forming part of Letters Patent No. 98,658, dated January 11, 1870.

*To all whom it may concern:*

Be it known that I, HAYDN M. BAKER, of Washington, in the District of Columbia have invented a new and useful Process for Cleansing Cotton-Waste and Fibrous Substances saturated with oils and mixed with débris, which I verily believe has not before been known or used; and that the following is a full and exact description thereof.

The nature of my invention consists in certain properties possessed by a hot solution of silicate of potash or soda to displace oils from fibers by destroying the capillary attraction therefor, and substituting itself or themselves instead thereof; also, by increasing the density of the water in which the said fibers are suspended, and causing the oils to rise to the surface of the silicate of potash or soda solution by reason of their lesser specific gravity.

To enable others to make use of my invention, I will proceed to describe its practical application.

The only apparatus required for this process consists of a series of kettles and a washing-machine and drying apparatus.

The waste to be cleaned is placed in one of the kettles, with the aqueous solution of silicate of potash or soda of any desired density, which solution is made to boil for a sufficient length of time to disengage all the oils from the fiber. Then the temperature is allowed to subside to discontinue the mechanical action of the boiling.

The oils rise to the surface, from whence they may be skimmed off.

The waste or fibrous matter is now to be pressed nearly dry, and then transferred to the next kettle, which contains a small quantity of soap in water, and boiled as long as the operator deems necessary, and from thence to a washing or agitating machine, and then to the next kettle, which contains pure water, in which it is to be boiled as long as the requirements of the process indicate. The waste or fibrous matter is now to be pressed and transferred to the drying apparatus, and when sufficiently dry is ready for reuse or the market.

The silicate of potash or soda solution is allowed to repose long enough to permit the fragments of coal, rock, sand, &c., to subside, and the clear solution is then to be decanted or drawn off to allow an opportunity of cleansing the kettle, to which it is to be returned subsequent to cleansing said kettle, when and where it is ready for use in cleansing new quantities of waste or fibrous matter again.

The advantages of this invention are, that it provides an economical method of removing oils, gums, and resins from fibrous substances without destruction to the fiber.

What I claim as my invention, and desire to secure by Letters Patent, is—

The use of hot aqueous solutions of silicate of potash or soda for the removal of oils, gums, and resins from fibrous substances, in the manner herein described and set forth, or by any other manner substantially the same.

HAYDN M. BAKER.

Witnesses:
 EDM. F. BROWN,
 C. BESTOR.